United States Patent
Zhao et al.

(10) Patent No.: US 10,257,118 B2
(45) Date of Patent: Apr. 9, 2019

(54) IMPLEMENTATION METHOD AND DEVICE FOR VLAN TO ACCESS VF NETWORK, AND FCF

(71) Applicant: ZTE Corporation, Shenzhen (CN)

(72) Inventors: Qingling Zhao, Shenzhen (CN); Jin Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 242 days.

(21) Appl. No.: 15/106,307

(22) PCT Filed: Jun. 19, 2014

(86) PCT No.: PCT/CN2014/080348
§ 371 (c)(1),
(2) Date: Jun. 19, 2016

(87) PCT Pub. No.: WO2015/090023
PCT Pub. Date: Jun. 25, 2015

(65) Prior Publication Data
US 2017/0034077 A1 Feb. 2, 2017

(30) Foreign Application Priority Data

Dec. 19, 2013 (CN) .......................... 2013 1 0706125

(51) Int. Cl.
*H04L 12/933* (2013.01)
*H04L 12/46* (2006.01)
(Continued)

(52) U.S. Cl.
CPC ......... *H04L 49/15* (2013.01); *H04B 10/2504* (2013.01); *H04L 12/4641* (2013.01); *H04L 49/354* (2013.01); *H04L 49/357* (2013.01)

(58) Field of Classification Search
CPC .. H04L 49/15; H04L 12/4641; H04B 10/2504
See application file for complete search history.

(56) References Cited

U.S. PATENT DOCUMENTS

2006/0159081 A1  7/2006 Dropps
2009/0092141 A1  4/2009 Banerjee
(Continued)

FOREIGN PATENT DOCUMENTS

CN    1820463 A    8/2006
CN    102111318 A  6/2011
(Continued)

OTHER PUBLICATIONS

International Search Report for corresponding application PCT/CN2014/080348 filed on Jun. 19, 2014; dated Sep. 26, 2014.
(Continued)

Primary Examiner — Siming Liu
(74) Attorney, Agent, or Firm — Cantor Colburn LLP (57) ABSTRACT

Provided are an implementation method and device for a Virtual Local Area Network (VLAN) to access a Visual Fabric (VF) network, and a Fiber Channel over Ethernet Forwarder (FCF). The method includes that: a VF network and corresponding relationships between the VF network and plurality of VLANs needing to access are configured according to a preset rule; and the plurality of VLANs are associated to the same VF network according to the configured corresponding relationships, wherein terminals in different VLANs are allowed to perform data intercommunication.

16 Claims, 5 Drawing Sheets (51) Int. Cl.
*H04L 12/931* (2013.01)
*H04B 10/25* (2013.01)

(56) References Cited

U.S. PATENT DOCUMENTS

2011/0299539 A1    12/2011  Rajagopal et al.
2012/0254440 A1*   10/2012  Wang ................ H04L 12/4645
                                                          709/226

FOREIGN PATENT DOCUMENTS

CN    102111395 A    6/2011
CN    102316175 A    1/2012

OTHER PUBLICATIONS

Supplementary European Search Report dated Jan. 3, 2017, EP Application No. EP14872593, 9 pages.

* cited by examiner

Fig. 1

Fig. 2 a VF network and corresponding relationships between the VF network and plurality of VLANs needing to access are configured according to a preset rule — S302 the plurality of VLANs are associated to the same VF network according to the configured corresponding relationships, wherein terminals in different VLANs are allowed to perform data intercommunication — S304

IMPLEMENTATION METHOD AND DEVICE FOR VLAN TO ACCESS VF NETWORK, AND FCF

TECHNICAL FIELD

The present disclosure relates to the field of data centre storage, and in particular to an implementation method and device for a Virtual Local Area Network (VLAN) to access a Visual Fabric (VF) network, and a Fibre Channel over Ethernet Forwarder (FCF).

BACKGROUND

Figure 1:
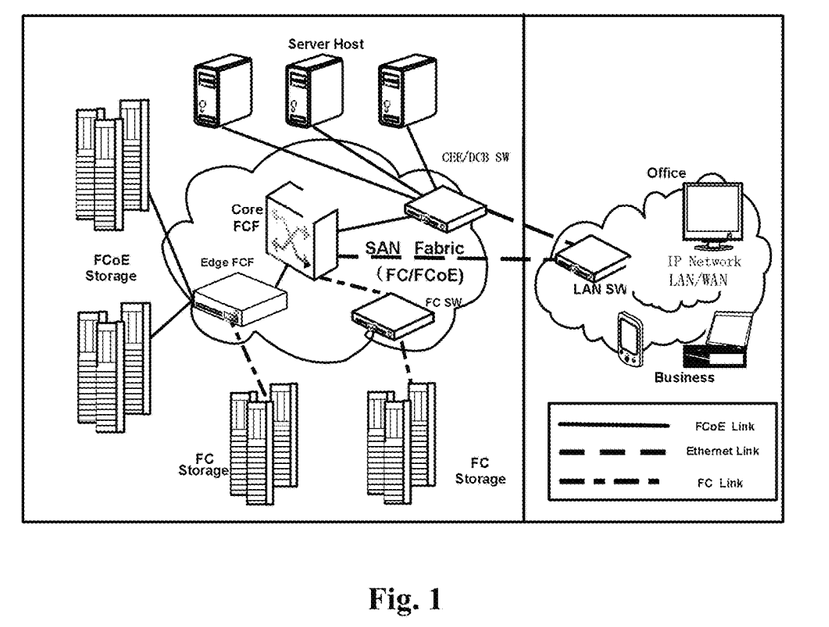
FIG. 1 is a schematic diagram of an FCoE data centre network architecture according to the related art.

With the development of data centre storage technology and the evolution of Ethernet technology, more and more storage networks use the Ethernet as their transmission links. The Fibre Channel (FC) protocol architecture which dominates the traditional Storage Area Network (SAN) market starts converging with the Ethernet, namely the hot Fibre Channel over Ethernet (FCoE) technology nowadays. In the FCoE network shown in FIG. 1, a Converged Network Adapter (CAN) card of a server host can connect to the SAN and a Local Area Network (LAN) simultaneously, which implements intercommunication of storage and application.

For the traditional FC protocol, for achieving the virtualization of a fabric network, a VF technology is proposed. Different VF networks (which are usually embodied by a Virtual Storage Area Network (VSAN) in the existing device) are differentiated by a VF Identifier (ID); the different VFs have individual resources, for example, each VF network independently selects a Principle Switch (PS), independently allocates a Domain ID and a Fibre Channel Identifier (FCID), and so on. All control frames and service frames among the different VF networks are isolated from each other and differentiated by encapsulating a VF label at the outer layer of an FC frame, wherein the VF ID of 12 bits is in the label for identifying the VF network to which data belongs.

The VLAN has, in the Ethernet, functions of isolating a broadcast message, isolating a layer 2 link or isolating a terminal, which plays an important role in LAN network security, resource partitioning and network performance maximization.

After applying the FCoE technology, data is transmitted in a Data Centre Bridging (DCB) Ethernet link by using an Ethernet frame of an FCoE format, and the convergence of the SAN network and the user LAN is realized. Because functions of the VF technology are similar to that of the VLAN technology, for reducing redundancy, a one-to-one corresponding relationship between the VF ID and the VLAN ID is established in the implementation of an FCoE device, and the VF label is replaced with a VLAN label. On an FCoE SAN network edge access device, namely an FCF, for implementing transition and extension of the FC towards the FCoE, it is also needed to provide the access of an FC SAN device. In such an application, it is also needed to perform conversion between an FC format and the FCoE format, wherein the mapping of the VF label and the VLAN label is necessary.

All of the current mainstream FCoE devices on the market exclusively map a certain VF ID to a specified VLAN ID, and even apply the same ID to the VF network and the VLAN, which makes the use of the VLAN in the FCoE network very inflexible. Especially for a host side (initiator side) device, it is usually connected to the SAN and the LAN, if the VLAN is needed to implement service isolation between the hosts, then it is bound to be limited by the mapping of the VF ID.

Figure 2:
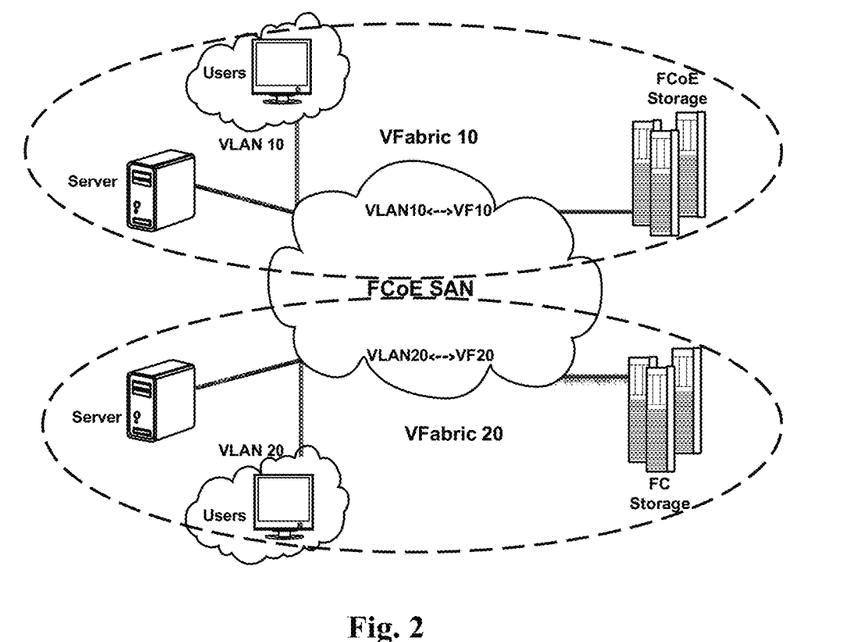
FIG. 2 is a schematic diagram of an FCoE network architecture when a VLAN and a VF network have a strong coupling according to the related art.

As shown in FIG. 2, under a one-to-one mapping relationship, the partitioning of the VLAN and the configuration of the VF network form a strong coupling, which greatly limits the function of the VLAN. When the whole FCoE network uses only one VF network, all devices are in the same VLAN, which can easily cause the blocking of this VLAN link and the waste of other VLAN links. To make full use of the functions like link isolation of the VLAN for the LAN, it is needed to partition the SAN in different VF networks, and its Domain ID, name service, ZONE partition and others need independent management sources, which consumes lots of CPU, memory and other system resources, and makes the network configuration become very complicated.

Aiming at the above problems in related art, an effective solution has not been presented.

SUMMARY

Aiming at the technical problems of an implementation solution for a VLAN to access a VF network in related art that resources are wasted and network configuration implementation is complicated, the present disclosure provides an implementation method and device for a VLAN to access a VF network, and an FCF, for at least solving the above technical problems.

According to an aspect of the present disclosure, an implementation method for a VLAN to access a VF network is provided, which includes that: a VF network and corresponding relationships between the VF network and plurality of VLANs needing to access are configured according to a preset rule; and the plurality of VLANs are associated to the same VF network according to the configured corresponding relationships, wherein terminals in different VLANs are allowed to perform data intercommunication.

Preferably, the preset rule includes that: the same VF network corresponds to the plurality of VLANs, and the same VLAN only corresponds to the unique VF network.

Preferably, associating the plurality of VLANs to the same VF network according to the configured corresponding relationships includes that: network resources of the VF network are shared with the plurality of associated VLANs; and the terminals in the plurality of associated VLANs are accessed according to the shared network resources.

Preferably, after the terminals in the plurality of associated VLANs are accessed according to the shared network resources, the method includes that: after the terminals access the VF network, a corresponding relationship between an Fibre Channel Identifier (FCID) and a VLAN ID is established; a destination VLAN ID is searched according to a destination FCID in a received message; and the message is forwarded to a forwarding device or the terminal corresponding to the destination VLAN ID to implement intercommunication between the terminals.

Preferably, the method is applied to the FCF.

According to another aspect of the present disclosure, an implementation device for a VLAN to access a VF network is also provided, which includes: a configuring module, which is configured to configure the VF network and the corresponding relationships between the VF network and plurality of VLANs needing to access according to the preset rule; and an associating module, which is configured to associate the plurality of VLANs to the same VF network according to the configured corresponding relationships, wherein the terminals in different VLANs are allowed to perform the data intercommunication.

Preferably, the configuring module is configured to configure the VF network and the corresponding relationships when the preset rule includes the following content: the same VF network corresponds to the plurality of VLANs, and the same VLAN only corresponds to the unique VF network.

Preferably, the associating module includes: a sharing unit, which is configured to share the network resources of the VF network with the plurality of associated VLANs; and an accessing unit, which is configured to access the terminals in the plurality of associated VLANs according to the shared network resources.

Preferably, the associating module further includes: an establishing unit, which is configured to, after the terminals access the VF network, establish the corresponding relationship between the FCID and the VLAN ID; a searching unit, which is configured to search the destination VLAN ID according to the destination FCID in the received message; and a forwarding unit, which is configured to forward the message to the forwarding device or the terminal corresponding to the destination VLAN ID to implement the intercommunication between the terminals.

According to another aspect of the present disclosure, an FCF is also provided, which includes the above device.

Through the above embodiments of the present disclosure, by adopting the technical means that plurality of VLANs access the same VF network by configuring according to the preset rule, and the terminals in different VLANs can intercommunicate, the technical problems of an implementation solution for a VLAN to access a VF network in related art that resources are wasted and network configuration implementation is complicated are solved, thereby removing the strong coupling of the VF network and the VLAN on the corresponding relationship between the VF network and the VLAN, implementing flexible allocation of the VLANs under the same VF network, and saving network resources.

BRIEF DESCRIPTION OF THE DRAWINGS

The accompanying drawings described here are used for providing a deeper understanding of the present disclosure, and constitute a part of the application; schematic embodiments of the present disclosure and description thereof are used for illustrating the present disclosure and not intended to form an improper limit to the present disclosure. In the accompanying drawings.

DETAILED DESCRIPTION OF THE EMBODIMENTS

The present disclosure is elaborated below with reference to the accompanying drawings and embodiments. Note that, embodiments and features of the embodiments in the application can be combined with each other on condition of not conflicting.

Figure 3:
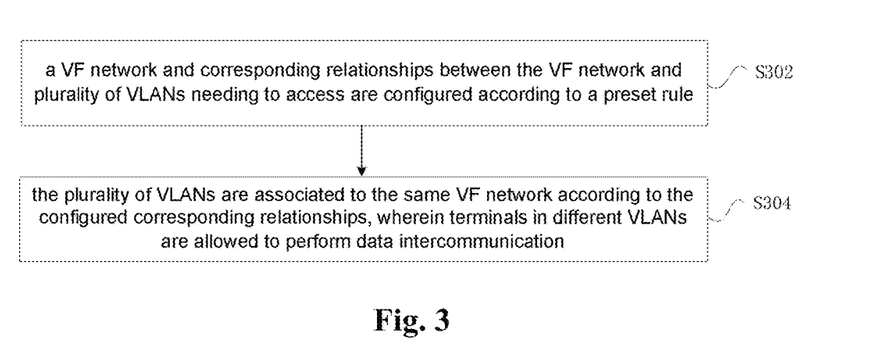
FIG. 3 is a flowchart of an implementation method for a VLAN to access a VF network according to an embodiment of the present disclosure.

FIG. 3 is a flowchart of an implementation method for a VLAN to access a VF network according to an embodiment of the present disclosure. As shown in FIG. 3, the method includes the following processing steps.

Step 302: a VF network and corresponding relationships between the VF network and plurality of VLANs needing to access are configured according to a preset rule. The configuration is that the plurality of VLANs corresponding to the same VF network share network resources (namely resources of the FCF) of the VF network. In the present embodiment, the preset rule can include that: the same VF network corresponds to the plurality of VLANs, and the same VLAN only corresponds to the unique VF network.

Step 304: the plurality of VLANs are associated to the same VF network according to the configured corresponding relationships, wherein terminals in different VLANs are allowed to perform data intercommunication. The step can be characterized by the following form: the network resources of the VF network are shared with the plurality of associated VLANs; and the terminals in the plurality of associated VLANs are accessed according to the shared network resources. After the terminals access the VF network, a corresponding relationship between the FCID and the VLAN ID is established; the destination VLAN ID is searched according to the destination FCID in the received message; and the message is forwarded to the forwarding device or the terminal corresponding to the destination VLAN ID to implement intercommunication between the terminals.

The implementation method for the VLAN to access the VF network can be applied to the FCF, but is not limited to this.

Through the above processing steps, because the same VF network corresponds to the plurality of VLANs, and the plurality of VLANs can perform data intercommunication, the strong coupling formed by a one-to-one mapping relationship between the VF network and the VLAN is removed, flexible allocation of the VLANs under the same VF network is implemented, and the effects of saving the network resources and optimizing the Ethernet performance are achieved.

Figure 4:
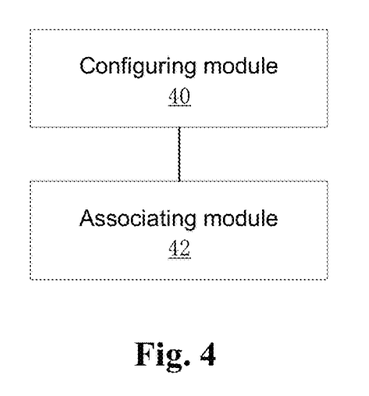
FIG. 4 is a structure diagram of an implementation device for a VLAN to access a VF network according to an embodiment of the present disclosure.

An implementation device for the VLAN to access the VF network is provided in the present embodiment, which is used for implementing the above embodiments and preferred implementations, and these which have been illustrated will not be repeated here; the modules involved in the device are illustrated below. For example, the term "module" can implement a combination of software and/or hardware with expected functions. Although the device described in the following embodiment is implemented by software preferably, the implementation through hardware, or the combination of software and hardware is possible and conceived. FIG. 4 is a structure diagram of the implementation device for the VLAN to access the VF network according to an embodiment of the present disclosure. As shown in FIG. 4, the device includes:

a configuring module 40, which is configured to configure the VF network and the corresponding relationships between the VF network and plurality of VLANs needing to access according to the preset rule; and an associating module 42, which is connected to the configuring module 40 and configured to associate the plurality of VLANs to the same VF network according to the configured corresponding relationships, wherein the terminals in different VLANs are allowed to perform the data intercommunication.

In the present embodiment, the configuring module 40 is configured to configure the VF network and the corresponding relationships when the preset rule includes the following content: the same VF network corresponds to the plurality of VLANs, and the same VLAN only corresponds to the unique VF network.

Figure 5:
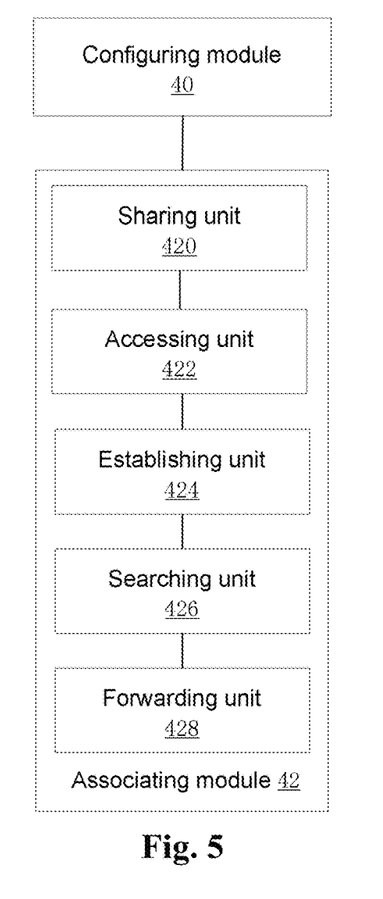
FIG. 5 is another structure diagram of an implementation device for a VLAN to access a VF network according to an embodiment of the present disclosure.

As shown in FIG. 5, the associating module 42 includes the following processing units: a sharing unit 420, which is configured to share the network resources of the VF network with the plurality of associated VLANs; and an accessing unit 422, which is connected to the sharing unit 420 and configured to access the terminals in the plurality of associated VLANs according to the shared network resources.

Preferably, as shown in FIG. 5, the associating module 42 may also include the following processing units: an establishing unit 424, which is configured to, after the terminals access the VF network, establish the corresponding relationship between the FCID and the VLAN ID; a searching unit 426, which is configured to search the destination VLAN ID according to the destination FCID in the received message; and a forwarding unit 428, which is connected to the searching unit 426 and configured to forward the message to the forwarding device or the terminal corresponding to the destination VLAN ID to implement the intercommunication between the terminals.

As described above, the above modules involved in the present embodiment can be implemented by the corresponding hardware. For example, all the above modules can be in a processor, of course, it is feasible that at least two processing modules are in the same processor.

For understanding the above embodiments better, an elaboration is given below in combination with the preferred embodiments.

Embodiment 1

In the existing solution, the VF network and the VLAN are in the one-to-one mapping relationship, and the partitioning of the VLAN and the configuration of the VF network form a strong coupling, which greatly limits the function of the VLAN. When the whole FCoE network uses only one VF network, all devices are in the same VLAN, which can easily cause the blocking of this VLAN link and the waste of other VLAN links. To make full use of the functions like link isolation of the VLAN for the LAN, it is needed to partition the SAN in different VF networks, and its Domain ID, name service, ZONE partition and others need independent management sources, which consumes lots of CPU, memory and other system resources, and makes the network configuration become very complicated.

For solving the above problems, the technical solution of the present embodiment is implemented as follows:

the main design idea of the present embodiment is that: in the FCoE device configuration, the same VF network can be bound with plurality of VLAN IDs, but the same VLAN ID can only correspond to the unique VF ID. In the SAN, for the devices under the same VF network, an FCoE Initialization Protocol (FIP) link controls the message to be strictly isolated according to the VLAN; but after a link is established, the devices in different VLANs are allowed to forward, through the FCF, the message by crossing VLAN routes, so as to implement the data intercommunication without being limited by the VLAN.

The technical solution of the present embodiment can be implemented by the following modules:

a VF module (being equivalent to the configuring module 40), which takes the VF ID as differentiation, and takes charge of management and maintenance of FC Fabric attribute and information, such as FCID pool management, name service and ZONE management;

an FIP controller module (being equivalent to the associating module 42), which takes the VLAN ID as differentiation, and takes charge of operation of an FIP protocol in the specified VLAN, and completes setup and maintenance of an FC-AV (FLOGI, a process of logically connecting a node to an architecture switch) virtual link;

an FCoE route module (being equivalent to the associating module 42), which takes charge of FC route maintenance and FCoE data forwarding;

an FCID-Media Access Control (MAC) table managing module (being equivalent to the associating module 42), which takes charge of maintenance of the mapping relationship between the FCID and the MAC+VLAN, and is used for FCoE data forwarding. The FCID-MAC table includes the following information:

VF ID: corresponding to the VF ID in the VF example;

FCID: a next-hop FCID is obtained through the FC route, for example, the destination FCID of a next-hop ENode, or a domain controller ID of a next-hop FCF device;

MAC: an MAC address corresponding to the next-hop FCID;

VLAN ID: the VLAN ID used by the next-hop FCID;

by taking the VF ID and the FCID as indexes, the FCID-MAC table is looked up to obtain the MAC and VLAN ID information corresponding to a next-hop node, so that the FCoE message is forwarded among the different VLANs under the same VF ID.

The operating process of the above modules is as follows.

Figure 6:
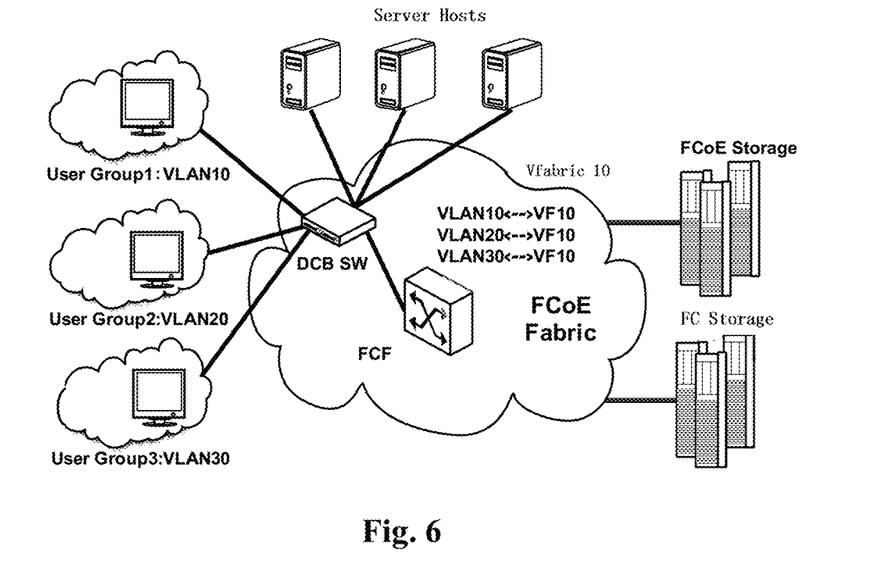
FIG. 6 is a schematic diagram of a network architecture for a VF network to support plurality of VLANs according to the preferred embodiment 1 of the present disclosure.
Figure 7:
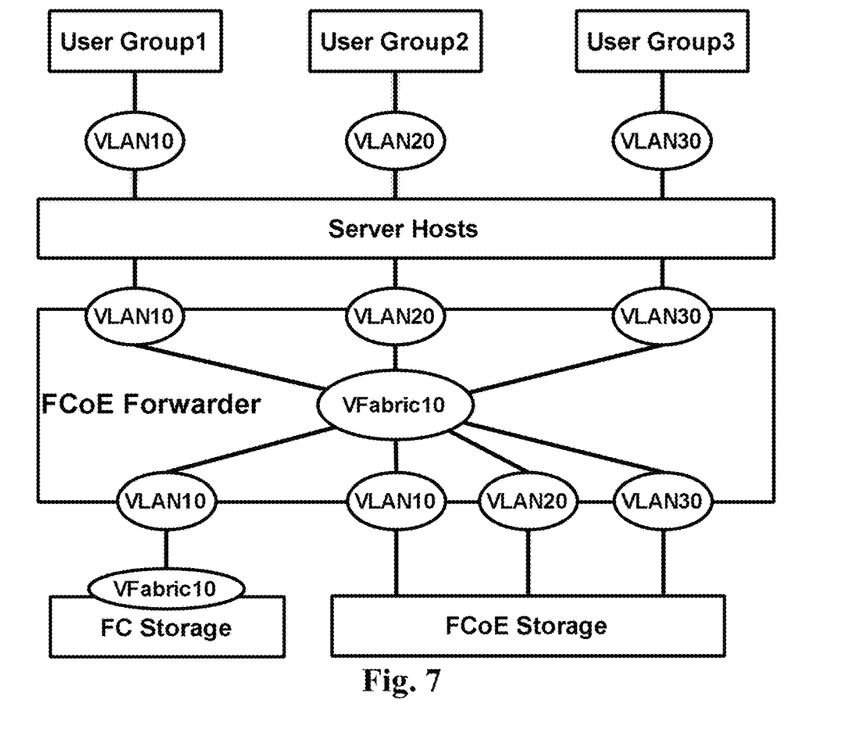
FIG. 7 is a schematic diagram of configuration implementation for a VF network to support plurality of VLANs according to the preferred embodiment 1 of the present disclosure.

The first step: the FIP controller module generates an independent example by taking the VLAN ID as the identifier, and the FIP of each VLAN example operates separately; by configuring, the plurality of VLAN examples are mapped to the same VF example; before operating the FIP protocol, the VLAN example can obtain from the VF example the needed communication resources (such as the mapping relationship and the Fabric attribute). FIG. 6 shows a network architecture for a VF network to support plurality of VLANs. FIG. 7 shows a schematic diagram of configuration implementation for a VF network to support plurality of VLANs.

The second step: when setting up the FLOGI virtual link successfully, the FIP controller generates the mapping relationship between the FCID and the MAC+VLAN, and adds it to the FCID-MAC table. By taking the VF ID and the next-hop FCID as indexes, the FCID-MAC table is looked up to obtain the corresponding MAC address and the VLAN ID.

The third step: when receiving an FCoE frame, the FCoE forwarding module completes by looking up the route and the FCID-MAC table.

Wherein, the first step can be considered as the specific implementation of Step 302 in the embodiment shown in FIG. 3 when implementing specifically.

From the above, the present embodiment provides a solution which is applied in an FCoE network device, and flexibly partitions the VLAN under the same VF network, thereby removing the limit of the VF network to the VLAN, and reducing the influence of the VLAN partitioning of the LAN on the SAN. The solution can save the occupation and consumption of Fabric management resources of the SAN, and enable the advantages of the VLAN technology on network security, broadcast domain isolation, resource division and other aspects to be fully fulfilled, which is more beneficial to optimize the FCoE network link performance.

Embodiment 2

Figure 8:
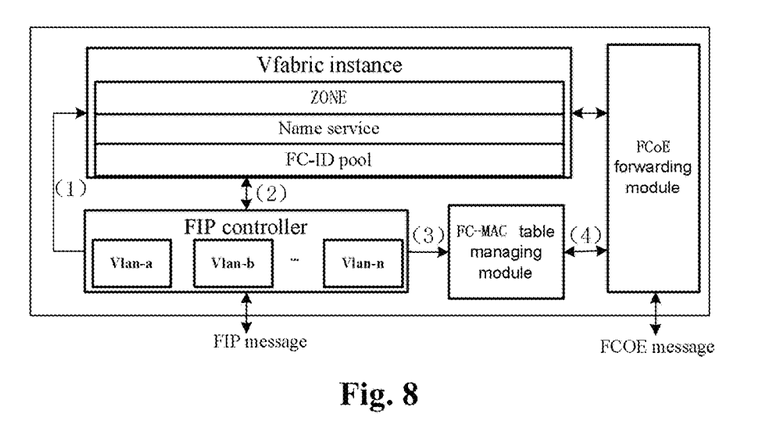
FIG. 8 is a schematic diagram of a system module for a VF network to support plurality of VLANs according to the preferred embodiment 2 of the present disclosure.

Referring to FIG. 8, according to the specific implementation method in an FCF device system, cooperative relationships of these modules in the system are illustrated.

(1) According to the configuration, FIP controller examples of different VLANs are created, and mapping relationships between the FIP controller examples and the same VF example are established. The step can be considered as the specific implementation of Step 302 in the embodiment shown in FIG. 3.

(2) The FIP controller in each VLAN performs own FIP interaction, obtains the VF attribute through the mapping relationship, and transfers neighbour device information to the VF example.

(3) The FIP controller sets up the FLOGI virtual link, generates FCID-MAC entries, and adds the FCID-MAC entries to the FC-MAC table managing module.

(4) after the virtual link is set up, the FCoE forwarding module implements the cross-VLAN forwarding of the FCoE under the same VF network by looking up the route and the FCID-MAC table.

Note that, the steps (2)-(4) can be considered as the specific implementation of Step 304 in the embodiment shown in FIG. 3.

Aiming at several different network scenarios, the specific implementation method of the present embodiment is illustrated below.

Figure 9:
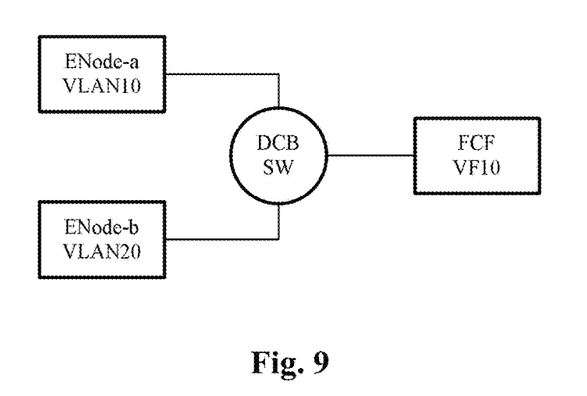
FIG. 9 is a schematic diagram of an implementation solution for an ENode to access an FCF according to the preferred embodiment 2 of the present disclosure.

First of all, referring to the FCoE SAN network in FIG. 9, the implementation solution that the ENode accesses the FCF is described as: two ENodes use the different VLANs, and provide IT services for different LAN users; at the same time, the ENodes access the same VF network, and share the stored network resources.

An ENode-a configuration uses the VLAN10, and an ENode-a configuration uses the VLAN20. An FCF configuration uses the VF network whose VF ID is 10; at the same time, the VLAN10 and the VLAN20 are mapped to the VF10.

The ENode-a sends an FCF Discovery Solicitation (DS) in the VLAN10. After receiving a discovery solicitation message sent from the ENode-a, the FCF replies an FCF Discovery Advertisement (DA), wherein the DA carries the VF ID corresponding to the VLAN10 and an MAC address MAC-f of a VF_Port controller. After receiving the DA replied by the FCF, the ENode-a obtains the VF ID corresponding to the VLAN10.

The ENode-b sends an FCF DS in the VLAN20. After receiving a discovery solicitation message sent from the ENode-b, the FCF replies an FCF DA, wherein the DA carries the VF ID corresponding to the VLAN20. After receiving the DA replied by the FCF, the ENode-b obtains the VF ID corresponding to the VLAN20.

The ENode-a sends an FLOGI solicitation to the FCF. After receiving an FLOGI solicitation message from the ENode-a, the FCF maps from the VLAN10 to the VF10, allocates the FCID-a and the MAC-a from an FCID pool of the VF10, and replies them to the ENode-a. The FCF records ENode-a login information, and generates the FCID-MAC entries. After receiving the FLOGI LS_ACC replied by the FCF, the ENode-a generates the FCID-MAC entries.

| device | VF ID | destination FCID | destination MAC | VLAN ID |
|---|---|---|---|---|
| FCF | VF10 | FCID-a | MAC-a | VLAN10 |
| ENode-a | VF10 | FFFFFEh | MAC-f | VLAN10 |

The ENode-b sends an FLOGI solicitation to the FCF. After receiving an FLOGI solicitation message from the ENode-b, the FCF maps from the VLAN20 to the VF10, allocates the FCID-b and the MAC-b from the FCID pool of the VF10, and replies them to the ENode-b. The FCF records ENode-b login information, and generates the FCID-MAC entries. After receiving the FLOGI LS_ACC replied by the FCF, the ENode-b generates the FCID-MAC entries.

| device | VF ID | destination FCID | destination MAC | VLAN ID |
|---|---|---|---|---|
| FCF | VF10 | FCID-b | MAC-b | VLAN20 |
| ENode-b | VF10 | FFFFFEh | MAC-f | VLAN20 |

The ENode-a sends an FCoE frame to the ENode-b, wherein the source FCID is the FCID-a, and the destination FCID is the FCID-b. Because the FCF serves as an ENode-a gateway, the route next-hop of the FCoE frame is the VF_Port controller (FFFFFEh) of the FCF; by looking up the FCID-MAC table, the destination MAC of the FCoE frame is the MAC-f, and the VLAN ID is 10.

The FCF receives the FCoE frame sent by the ENode-a, wherein the destination FCID is FCID-b; because the FCID-b is the FCID in the same domain, by looking up the FCID-MAC table, the next-hop destination MAC is the MAC-b, and the VLAN ID is 20. The FCF modifies the Ethernet head of the FCoE frame as: destination MAC--MAC-b, source MAC--MAC-f, VLAN ID--20. The modified FCoE frame will be sent to the ENode-b.

After receiving the FCoE frame, the ENode-b performs corresponding processing; if it is needed to reply the FCoE frame to the ENode-a, the forwarding flow refers to the description above, that is, the FCF forwards the FCoE frame from the VLAN20 to the VLAN10, and sends to the ENode-a.

Figure 10:
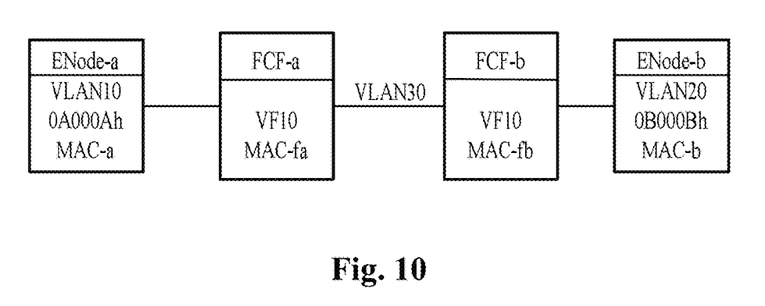
FIG. 10 is a schematic diagram of an implementation solution for an FCF and an FCF to intercommunicate according to the preferred embodiment 2 of the present disclosure.

Referring to FIG. 10, the present embodiment provides another implementation solution.

The ENode-a accesses the FCoE SAN through the FCF-a, and the ENode-b accesses the FCoE SAN through the FCF-b; the VF ID used in the SAN is 10, and all of the VLAN10, VLAN20 and VLAN30 are mapped to the VF10.

The Domain ID used by the FCF-a is 10 (0xA), and the Domain ID used by the FCF-b is 11 (0xB).

The ENode-a logs onto the FCF-a; the FCF-a allocates the FCID 0A000Ah to the ENode-a, and generates the FCID-MAC entries:

| device | VF ID | destination FCID | destination MAC | VLAN ID |
| --- | --- | --- | --- | --- |
| FCF-a | VF10 | 0A000Ah | MAC-a | VLAN10 |
| ENode-a | VF10 | FFFFFEh | MAC-fa | VLAN10 |

The ENode-b logs onto the FCF-b; the FCF-b allocates the FCID 0B000Bh to the ENode-b, and generates the FCID-MAC entries:

| device | VF ID | destination FCID | destination MAC | VLAN ID |
| --- | --- | --- | --- | --- |
| FCF-b | VF10 | 0B000Bh | MAC-b | VLAN20 |
| ENode-b | VF10 | FFFFFEh | MAC-fb | VLAN20 |

The FCF-a and the FCF-b set up a VE-to-VE virtual link based on the VLAN30, and generate the FCID-MAC entries:

| device | VF ID | destination FCID | destination MAC | VLAN ID |
| --- | --- | --- | --- | --- |
| FCF-a | VF10 | 0B0000h | MAC-fb | VLAN30 |
| FCF-b | VF10 | 0A0000h | MAC-fa | VLAN30 |

The ENode-a sends the FCoE frame to the ENode-b, wherein the source FCID is 0A000Ah, and the destination FCID is 0B000Bh. Because the FCF-a serves as the ENode-a gateway, the route next-hop of the FCoE frame is the VF_Port controller (FFFFFEh) of the FCF-a; by looking up the FCID-MAC table, the destination MAC of the FCoE frame is the MAC-fa, and the VLAN ID is 10.

The FCF-a receives the FCoE frame sent by the ENode-a, wherein the destination FCID is 0B000Bh; because 0B000Bh is the FCID in another domain, the next-hop FCID is a Domain controller ID (0B0000h) of another FCF; by looking up the FCID-MAC table, the next-hop destination MAC is the MAC-fb, and the VLAN ID is 30. The FCF modifies the Ethernet head of the FCoE frame as: destination MAC--MAC-fb, source MAC--MAC-fa, VLAN ID--30. The modified FCoE frame will be sent to the FCF-b.

After receiving the FCoE frame sent from the FCF-a, wherein the destination FCID is 0B000Bh, because 0B000Bh is the FCID in the same domain as the FCF-b, it is the last hop. By looking up the FCID-MAC table according to the destination FCID, the destination MAC is the MAC-b, and the VLAN ID is 20. The FCF modifies the Ethernet head of the FCoE frame as: destination MAC--MAC-b, source MAC--MAC-fb, VLAN ID--30. The modified FCoE frame will be sent to the FCF-b.

After receiving the FCoE frame, the ENode-b performs corresponding processing; if it is needed to reply the FCoE frame to the ENode-a, the forwarding flow refers to the description above, so it will not be repeated here.

Through the above solution provided by the present embodiment, the LAN user can flexibly use the VLAN function, and the SAN is managed by flexibly using the FC function without being limited by the VLAN, which solves the problem of too strong functional coupling of the VLAN and the VF network.

In another embodiment, a piece of software is also provided, which is used for implementing the technical solutions described in the above embodiments and preferred implementation.

In another embodiment, a storage medium is also provided, which stores the above software; the storage medium includes, but is not limited to, a compact disc, a floppy disc, a hard disc, an erasable memory, and so on.

Obviously, those skilled in the art should appreciate that the above modules and steps of the present disclosure can be implemented by a general-purpose computing device, and they can be centralized in a single computing device or distributed on a network composed of plurality of computing devices; optionally, they can be implemented by a program code which is capable of being executed by the computing device, so that they can be stored in a storage device and executed by the computing device; and in some situations, the presented or described steps can be executed in an order different from that described here; or they are made into integrated circuit modules, respectively; or plurality of modules and steps of them are made into a single integrated circuit module to realize. In this way, the present disclosure is not limited to any particular combination of hardware and software.

The above is only the preferred embodiment of the present disclosure and not intended to limit the present disclosure; for those skilled in the art, the present disclosure may have various modifications and changes. Any modifications, equivalent replacements, improvements and the like within the spirit and principle of the present disclosure shall fall within the scope of the claims of the present disclosure.

What is claimed is:

1. An implementation method for a Virtual Local Area Network (VLAN) to access a Virtual Fabric (VF) network, comprising:
   configuring the VF network and corresponding relationships between the VF network and a plurality of VLANs needing to access the VF according to a preset rule; and
   associating the plurality of VLANs to the same VF network according to the configured corresponding relationships, wherein terminals in different VLANs are allowed to perform data intercommunication.

2. The method according to claim 1, wherein the preset rule comprises:
   the same VF network corresponds to the plurality of VLANs, and the same VLAN only corresponds to the unique VF network.

3. The method according to claim 2, wherein the method is applied to a Fibre Channel over Ethernet Forwarder (FCF).

4. The method according to claim 1, wherein associating the plurality of VLANs to the same VF network according to the configured corresponding relationships comprises:
   sharing network resources of the VF network with the plurality of associated VLANs; and
   accessing the terminals in the plurality of associated VLANs according to the shared network resources.

5. The method according to claim 4, wherein after accessing the terminals in the plurality of associated VLANs according to the shared network resources, further comprising:
   after the terminals access the VF network, establishing a corresponding relationship between a Fibre Channel Identifier (FCID) and a VLAN ID;
   searching a destination VLAN ID according to a destination FCID in a received message; and forwarding the message to a forwarding device or the terminal corresponding to the destination VLAN ID to implement intercommunication between the terminals.

6. The method according to claim 5, wherein the method is applied to a Fibre Channel over Ethernet Forwarder (FCF).

7. The method according to claim 4, wherein the method is applied to a Fibre Channel over Ethernet Forwarder (FCF).

8. The method according to claim 1, wherein the method is applied to a Fibre Channel over Ethernet Forwarder (FCF).

9. An implementation device for a Virtual Local Area Network (VLAN) to access a Virtual Fabric (VF) network, comprising:
 a configuring module, which is configured to configure a VF network and corresponding relationships between the VF network and plurality of VLANs needing to access according to a preset rule; and
 an associating module, which is configured to associate the plurality of VLANs to the same VF network according to the configured corresponding relationships, wherein terminals in different VLANs are allowed to perform data intercommunication.

10. The device according to claim 9, wherein the configuring module is configured to configure the VF network and the corresponding relationships when the preset rule comprises the following content:
 the same VF network corresponds to the plurality of VLANs, and the same VLAN only corresponds to the unique VF network.

11. A Fibre Channel over Ethernet Forwarder (FCF), comprising a device according to claim 10.

12. The device according to claim 9, wherein the associating module comprises:
 a sharing unit, which is configured to share network resources of the VF network with the plurality of associated VLANs; and
 an accessing unit, which is configured to access the terminals in the plurality of associated VLANs according to the shared network resources.

13. The device according to claim 12, wherein the associating module further comprises:
 an establishing unit, which is configured to, after the terminals access the VF network, establish a corresponding relationship between a Fibre Channel Identifier (FCID) and a VLAN ID;
 a searching unit, which is configured to search a destination VLAN ID according to a destination FCID in a received message; and
 a forwarding unit, which is configured to forward the message to a forwarding device or the terminal corresponding to the destination VLAN ID to implement intercommunication between the terminals.

14. A Fibre Channel over Ethernet Forwarder (FCF), comprising a device according to claim 13.

15. A Fibre Channel over Ethernet Forwarder (FCF), comprising a device according to claim 12.

16. A Fibre Channel over Ethernet Forwarder (FCF), comprising a device according to claim 9.

* * * * *